(12) United States Patent
Cunningham (10) Patent No.: US 9,711,260 B2
(45) Date of Patent: Jul. 18, 2017

(54) HEAT SHIELD FOR CABLES

(71) Applicant: GENERAL CABLE TECHNOLOGIES CORPORATION, Highland Heights, KY (US)

(72) Inventor: Lawrence Patrick Cunningham, Glastonbury, CT (US)

(73) Assignee: General Cable Technologies Corporation, Highland Heights, KY (US)

( * ) Notice: Subject to any disclaimer, the term of this patent is extended or adjusted under 35 U.S.C. 154(b) by 9 days.

(21) Appl. No.: 14/938,756

(22) Filed: Nov. 11, 2015

(65) Prior Publication Data

US 2016/0133354 A1 May 12, 2016

Related U.S. Application Data (60) Provisional application No. 62/078,237, filed on Nov. 11, 2014.

(51) Int. Cl.
| | | |
|---|---|---|
| *H01B 7/02* | (2006.01) | |
| *H01B 7/29* | (2006.01) | |
| *H01B 7/28* | (2006.01) | |
| *G02B 6/44* | (2006.01) | |

(52) U.S. Cl.
CPC .......... *H01B 7/292* (2013.01); *G02B 6/4436* (2013.01); *H01B 7/28* (2013.01); *G02B 6/4402* (2013.01)

(58) Field of Classification Search
USPC ............. 174/110 R, 110 SR, 110 AR, 113 R, 174/120 R, 120 AR
See application file for complete search history.

(56) References Cited

U.S. PATENT DOCUMENTS

| | | | |
|---|---|---|---|
| 5,047,594 A | 9/1991 | Powell | |
| 2006/0137894 A1* | 6/2006 | Cusson | H01B 7/20 174/105 R |
| 2009/0042513 A1 | 2/2009 | Woosnam | |
| 2013/0092416 A1* | 4/2013 | Saito | H01B 3/28 174/120 SC |
| 2013/0180755 A1 | 7/2013 | Park et al. | |

OTHER PUBLICATIONS

Young, Lee W.; International Search Report and Written Opinion of the International Searching Authority, issued in International Application No. PCT/US2015/060218; dated as mailed on Mar. 11, 2016; 8 pages.

Thapliyal, P. C. et al., "Aerogels as Promising Thermal Insulating Materials: An Overview"; Journal of Materials, vol. 2014, Article ID 127049; published Apr. 27, 2014; Hindawi Publishing Corporation; 10 pages.

* cited by examiner

*Primary Examiner* — William H Mayo, III
(74) *Attorney, Agent, or Firm* — Ulmer & Berne LLP (57) ABSTRACT

A heat shield for use with cables in a nuclear environment can include a thermal insulator. The thermal insulator can have a low thermal conductivity and can be formed of a silica glass fiber material, an aerogel, or an aerogel-derived material. The heat shield can mitigate a 650° C. temperature spike caused by a severe accident condition. Cables including such heat shields can operate through a nuclear accident that causes an initial 650° C. temperature spike.

19 Claims, 5 Drawing Sheets

HEAT SHIELD FOR CABLES

REFERENCE TO RELATED APPLICATIONS

The present application claims the priority of U.S. provisional application Ser. No. 62/078,237, entitled HEAT SHIELD FOR CABLES, filed Nov. 11, 2014, and hereby incorporates the same application herein by reference in its entirety.

TECHNICAL FIELD

The present disclosure generally relates to the construction, and use, of heat shields in cables to reduce thermal shock caused by severe temperature spikes. The heat shields can be useful in the protection of cables in nuclear environments.

BACKGROUND

Nuclear reactor incidents can rapidly subject containment vessels to a variety of harsh conditions including damaging temperature spikes. Equipment, including cables, in such environments are critical to the continued safety and monitoring of the reactor and must retain functionality following exposure to a severe accident condition that can expose such equipment to thermal shocks having temperature spikes of 650° C. or more. Current equipment, including cables, associated with a nuclear reactor are not designed for exposure to such thermal shocks and can include components that would be damaged, or destroyed, by such rapid temperature changes. Consequently, there is a need for a heat shield that can be applied to cables used in nuclear environments to mitigate the impact of thermal shocks and maintain continued operation.

SUMMARY

In accordance with one embodiment, a cable includes one or more conductors, an insulation layer surrounding the one or more conductors, and a heat shield surrounding the insulation layer. The heat shield includes a thermal insulator. The thermal insulator has a thermal conductivity of about 0.2 W/m-K or less when measured at about 100° C. The thermal insulator includes one or more of a silica fiber material, an aerogel, and an aerogel-derived material.

In accordance with another embodiment, a cable includes one or more conductors, an insulation layer surrounding the one or more conductors, a jacket surrounding the insulating layer, and a heat shield surrounding the jacket. The heat shield includes a thermal insulator and optionally a protective layer surrounding the thermal insulator. The thermal insulator is formed of a thermal insulating material having a thermal conductivity of about 0.2 W/m-K or less when measured at about 100° C.

In accordance with another embodiment, a cable includes one or more conductors or optical fibers, an insulation layer surrounding the one or more conductors or optical fibers, and a heat shield surrounding the insulation layer. The heat shield includes a thermal insulator and optionally a protective layer surrounding the thermal insulator. The thermal insulator is formed of a thermal insulating material. The thermal insulating material includes one or more of an ablative material, a silica glass fiber material, an aerogel, and an aerogel-derived material.

DETAILED DESCRIPTION

Equipment, including cables, important to the safety of a nuclear environment must satisfy a variety of strict design and operational requirements to maintain functionality and integrity after a severe accident condition that can expose cables to a severe thermal shock. A severe accident condition can include situations where a failure of nuclear reactor causes the release of hydrogen gas which can explode upon ignition. In such severe accident conditions, the explosion of hydrogen gas can cause thermal shocks (e.g., temperature spikes) to the surrounding environment which directly affects all equipment, including cables. In addition to the immediate thermal shocks sustained at the time of such explosions, prolonged periods of intense heat can follow for periods of about 10, 20, 24, 30, and upwards of about 48 hours afterwards or more. For example, the initial thermal shock can cause temperatures to spike to about 650° C. or more. Furthermore, subsequent to the explosion ambient conditions surrounding cables can include temperatures of about 650° C. or less for sustained periods of time. The damaging effects of such a thermal shock, and subsequent heating, can be mitigated through the use of a heat shield around a cable that can moderate the sudden thermal increase through a gradual heat transfer and can allow for thermal equilibrium to be delayed until the surrounding environment is no longer hazardous to the cable. For example, in certain embodiments, a heat shield can be used to moderate a thermal shock of about 650° C. by moderating and delaying heat transmittance through the heat shield until the ambient conditions are no longer dangerous to the underlying cable components. A cable including a heat shield of the present disclosure can generally include a thermal insulator and a protective layer. As used herein, dangerous conditions can include temperatures that would cause degradation of the materials and components of a cable. In contrast to the underlying materials of a cable, a heat shield as described herein can withstand temperatures of about 650° C. without degradation when measured in accordance to ASTM C447-15 (2015).

According to certain embodiments, a thermal insulator can be formed from any suitable thermal insulating material that has a high thermal resistance and/or low thermal conductivity. Suitable materials having such properties can delay and moderate the severe temperature spike endured during a severe accident condition from reaching the functional components (e.g., conductor(s), insulation layers and jacket) of a cable by allowing only a gradual transfer of heat. Additionally, such materials can delay temperature equilibration until the ambient temperature of the containment vessel returns to a lower temperature.

As can be appreciated, the thickness of the thermal insulator can vary depending on the thermal profile associated with a particular severe accident condition and the thermal conductivity of the thermal insulating material. As can be appreciated, each reactor, or reactor design, can have a thermal profile associated with a severe accident condition such as, for example, a hydrogen gas buildup and explosion. Such a profile can include an immediate temperature spike followed by a gradual fall off to a reduced, steady-state temperature over a period of time. Thermal conductivity of the thermal insulating material can indicate the amount of heat transfer that can occur per unit time. In one embodiment, the thickness of the thermal insulator can be proportional to both the thermal conductivity of the thermal insulating material and the thermal profile of the severe accident condition. For example, as the thermal conductivity of the thermal insulating material decreases, the thickness of the thermal insulator can likewise be decreased as the amount of heat propagated through the thermal insulating material will be reduced. Likewise, a decrease to either the peak temperature of a thermal profile or the duration of elevated temperatures in a thermal profile can allow for a thinner thermal insulator as, respectively, less heat will either need to be transferred through the thermal insulator or the total time in which the heat transfer must be delayed can be reduced. In certain embodiments, a thermal insulator can have a thickness of about 10 mm; in certain embodiments, a thermal insulator can have a thickness of about 20 mm; and in certain embodiments, a thermal insulator can have a thickness of about 30 mm.

In one illustrative embodiment, a 10 mm thick thermal insulator formed from a silicon dioxide aerogel blanket can provide thermal shock protection from a temperature spike that reaches temperatures of about 620° C. before cooling to an ambient temperature of about 370° C. over the course of about 15 minutes.

In certain embodiments, suitable thermal insulating materials can additionally include further properties. For example, suitable thermal insulating materials can include properties of radiation tolerance, moisture insensitivity, and/or resistance to oxidative damage. Ideally, a cable having a heat shield will be radiation tolerant as well as moisture insensitive to withstand issues caused by a loss of coolant accident.

Thermal insulating materials that are radiation tolerant can provide an advantage over radiation intolerant materials because such radiation tolerant materials are not subject to continual radiation damage. Additionally, such radiation tolerant materials can facilitate the design of a heat shield by averting the need to simulate radiation aging through time-consuming techniques such as Arrhenius Aging. Examples of suitable radiation tolerant materials can include, for example, certain inorganic materials such as, for example, silica-based compositions.

In certain embodiments, the thermal insulating material can additionally, or alternatively, be moisture insensitive. Such moisture insensitivity can protect the heat shield from damage upon exposure to liquids. As can be appreciated, under the conditions of a severe accident condition, the heat shield of a cable can be exposed to a variety of materials including leaking coolant, aqueous boric acid, and steam. In certain embodiments, moisture insensitivity can be imparted by hydrophobic properties. Hydrophobic properties can help prevent a thermal insulating material from suffering from water-related degradation caused by entrapped moisture over time. In certain embodiments, a heat shield can have a water vapor sorption per ASTM C1104/C1104M-13a (2013) of about 2.25% by weight. In certain embodiments a cable having a heat shield can be certified as a IEEE 323 and can be designed to operate through a Loss-of-Coolant Accident ("LOCA") in a nuclear reactor. A non-limiting list of moisture insensitive materials can include polymeric and silica-based compositions.

Suitable thermal insulating materials can also be flexible. For example, in certain embodiments, exemplary thermal insulating materials can have a class rating of 'Flexible Resilient' in accordance to ASTM C 1101/C1101M-06 (2012) standards.

A non-limiting list of suitable materials expressing a low thermal conductivity that can serve as thermal insulators include ablative materials, silica glass fiber materials, aerogel, aerogel-derived compositions and combinations thereof.

Ablative materials can generally refer to any material that ablates, and possibly chars, upon exposure to high heat. Such materials ablate, or char, to dissipate heat and prevent damage to any underlying, protected, material. Examples of ablative materials can include phenolic impregnated carbon ablators ("PICA"), silicone-impregnated reusable ceramic ablators, and glass-filled epoxy-novolac resin systems such as avcoat. In certain embodiments, ablative materials, such as PICA, can be moisture-resistant and can have thermal conductivities of about 0.29 W/m K at about 23° C. and about 0.40 W/m K at about 1200° C.

Silica glass fiber materials can generally refer to materials consisting of high purity silica glass fibers. Such materials can primarily consist of air by volume. LI-900 silica tiles are an illustrative example of a silica glass fiber material. LI-900 silica tiles were used to protect the space shuttle from the heat of orbital reentry. Certain silica glass fiber materials can be both water-resistant and radiation-tolerant. Silica glass fibers can have a thermal conductivity of about 0.035 W/m K at about 121° C. and about 0.37 W/m K at about 1260° C.

Aerogel, and aerogel-derived materials, can have exceptionally low thermal conductivity as they primarily consist of encapsulated gases that inhibit conduction and convection through the material. Certain aerogel materials can be both radiation tolerant and moisture resistant including, for example, any of the silica, alumina, chromia, and tin dioxide based aerogels. Additionally, certain carbon-based aerogels, such as carbon nanotube aerogels, can also be radiation tolerant and moisture resistant. Inorganic and moisture resistant aerogels can be particularly suited for use in heat shields because their inherent radiation resistant and moisture resistant properties can obviate the need for extensive and time consuming Arrhenius Aging to determine their susceptibility to radiation degradation in a nuclear reactor. Aerogel materials can have a thermal conductivity as low as about 0.03 W/m K at about 23° C. and standard pressure. Additional thermal conductivity measurements for aerogel at elevated temperatures are depicted in Table 1.

TABLE 1

| | Mean Temperature (° C.) | | | | | | |
| --- | --- | --- | --- | --- | --- | --- | --- |
| | 0 | 100 | 200 | 300 | 400 | 500 | 600 |
| Thermal Conductivity (W/m-K) | 0.02 | 0.023 | 0.028 | 0.035 | 0.046 | 0.064 | 0.089 |

Aerogel-derived compositions can be used to improve the processability and flexibility of unprocessed aerogel which can be characteristically brittle. Examples of aerogel-derived compositions can include collections of individual aerogel particles as well as aerogel blankets that weave, or impregnate, aerogel particles into a flexible substrate such as for example, a non-woven fibrous sheet made from one, or more, of polyester, polyethylene, and the like. Aerogel-derived compositions can retain the excellent thermal conductivity of aerogel.

A thermal insulator can be formed into a variety of configurations. For example, certain aerogel-derived materials, such as aerogel blankets, can be applied as sheets, or tapes including, for example, 0.25 inch wide flexible tapes. In such embodiments, a conventional cable tape wrapping machine can be used to form the thermal insulator by spiral, helical, or longitudinal wrapping of the aerogel-derived tape. As can be appreciated, the structural stability of the thermal insulator can also be improved, in certain embodiments, by forming the thermal insulator with alternating lays. The use of alternating lays, such as, for example, the use of both a right-hand lay and a left-hand lay can mitigate damage to the thermal insulator from certain mechanical damages that damages only one of the lays.

In other embodiments using ablative materials, silica glass fiber materials, or solid aerogel materials, the thermal insulator can alternatively formed by either preshaping portions of the thermal insulating material to conform to the underlying cable or by dispersing the thermal insulating materials in, or on, a suitable binder that can be appropriately shaped or applied.

In addition to the thermal insulator, a heat shield can include a protective layer surrounding the thermal insulator to provide the thermal insulator with protection from physical damage. As can be appreciated, a protective layer can also block thermal radiation, such as infrared radiation, from transmittance through the heat shield. This can be useful when the thermal insulating material is, for example, a transparent aerogel. While the protective layer can be formed of any suitable material such as a ceramic material, aramid material, or metallic material, it can be advantageous to form the protective layer from a suitable metallic material. As can be appreciated, suitable metallic materials can remain stable even in the high radiation environment of a nuclear reactor and can provide adequate physical protective properties. Additionally, such metallic materials are malleable and can be easily shaped during, and after, installation into a nuclear reactor. In certain embodiments, it can be advantageous for the protective layer to exhibit high thermal conductivity. Examples of suitable metallic materials for a protective layer can include steel, copper, brass, nickel, zinc, and alloys and platings thereof. For example, in certain embodiments, the protective material can be formed of nickel, nickel-chromium alloy, or nickel plated copper. As can be appreciated however, certain metallic materials having large neutron cross sections, such as iron, can be converted into radioactive isotopes by exposure to a nuclear reactor and can be undesirable.

Protective layers can be applied over the insulating material in a variety of configurations to provide protection to the insulating material. For example, in certain embodiments employing a metallic material, the protective layer can be applied as a solid layer, as a protective tape, or as a braid. In more specific examples, such protective layers can be applied as a longitudinally applied corrugated tape, as a helically applied tape, or as a braided metal layer. Other suitable materials such as, for example, Kevlar®, can be similarly applied.

According to certain embodiments, a heat shield of the present disclosure can be used to protect cables from a damaged reactor's thermal shock. As can be appreciated, any of the various types of cables used in a nuclear reactor can be protected through the use of a heat shield including, for example, power cables, thermocouples, and control cables.

When used to protect a cable, a heat shield can be applied as a supplemental shield over the existing jacket of a cable. For example, referring to FIG. 1, a cable 10 including a heat shield can include one, or more, conductors 1, a crosslinked polyethylene insulation layer 2 surrounding the one, or more, conductors 1, and a crosslinked polyolefin jacket 3. The heat shield can surround the jacket 3 and can include a thermal insulator 4 and a protective layer 5. As can be appreciated, suitable cables can also contain fewer components without losing the benefits provided by a heat shield. For example, certain cables without one or more of an insulation layer 2, a jacket 3, and a protective layer 5 can still be protected by a thermal insulator 4 from thermal shock in certain embodiments.

As can be appreciated, the insulation and jacket layers of cables in a nuclear reactor can be constructed from a variety of suitable materials. For example, the insulation and jacket layers can independently be formed of materials such as cross-linked polyolefins ("XLPO"), cross-linked polyethylene ("XLPE"), polyimide, mica, chlorinated polyethylene ("CPE"), and chlorosulfonated polyethylene ("CSPE"). As can be further appreciated, such materials can be degraded by the conditions commonly found in severe accident conditions such as temperatures of about 400° C. or about 600° C.

Figure 1:
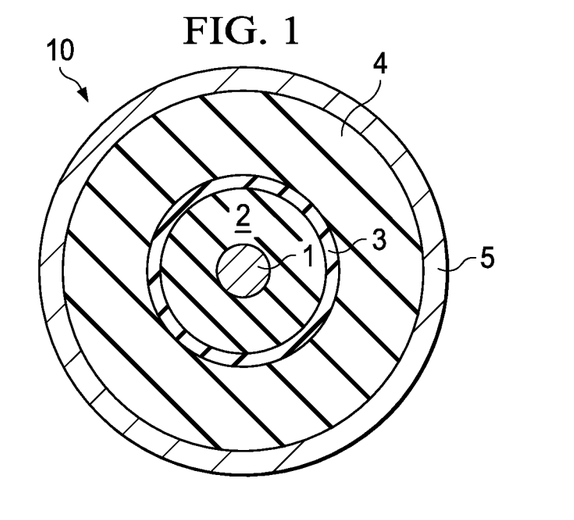
FIG. 1 depicts a cross-sectional view of a cable including a heat shield according to one embodiment.

Other variations of such a cable 10 are also possible. For example, a communications cable can optionally include one, or more, Mylar® or metallic shields surrounding at least one of the one, or more, conductors or can include a cable separator. Alternatively, in certain embodiments, a communications cable can include fiber optic strands in place of the one, or more, conductors. In other certain embodiments, a communications cable can alternatively use an inorganic mica tape in place of the insulation layer and/or jacket. Inorganic mica tape can help lower the thermal conductivity of a cable but can be damaged by exposure to moisture.

Cables employing such heat shields as described herein can be configured to pass the qualifications of IEEE 323 (1974 and/or 2003) and IEEE 383 (1974 and/or 2003). As can be appreciated, such cables can be Class 1E cables and can be suitable for use in existing nuclear reactors, or reactor designs, including, for example, Generation 3, Generation 3+, and Generation 4 reactors. Suitable examples of such reactors include, for example, Westinghouse Electric AP600 reactors, Westinghouse Electric AP1000 reactors, GE Advanced Boiling Water Reactors (ABWR), Mitsubishi Heavy Industries Advanced Pressurized Water Reactors (APWR), and Advanced CANDU Reactors (ACR-1000) and Korean APR1400 Reactors. Further details of nuclear reactors can be found in the following patents: U.S. Pat. No. 5,087,408; U.S. Pat. No. 5,096,659; and; U.S. Pre-Grant Publication No. 2007/0092053; and U.S. Pre-Grant Publication 2009/0323884, each incorporated by reference in their entirety. Further details of IEEE 323 standards, as well as cables designed to pass such standards, are disclosed in U.S. Provisional Application No. 62/036,829 hereby incorporated by reference. Cables employing the heat shields described herein can operate in nuclear reactors for about 60 years or more in certain embodiments, or about 40 years or more in certain embodiments.

As can be appreciated, a heat shield of the present disclosure can also be adapted, or retrofitted, for use on existing cables or cable designs.

Examples

Figure 2:
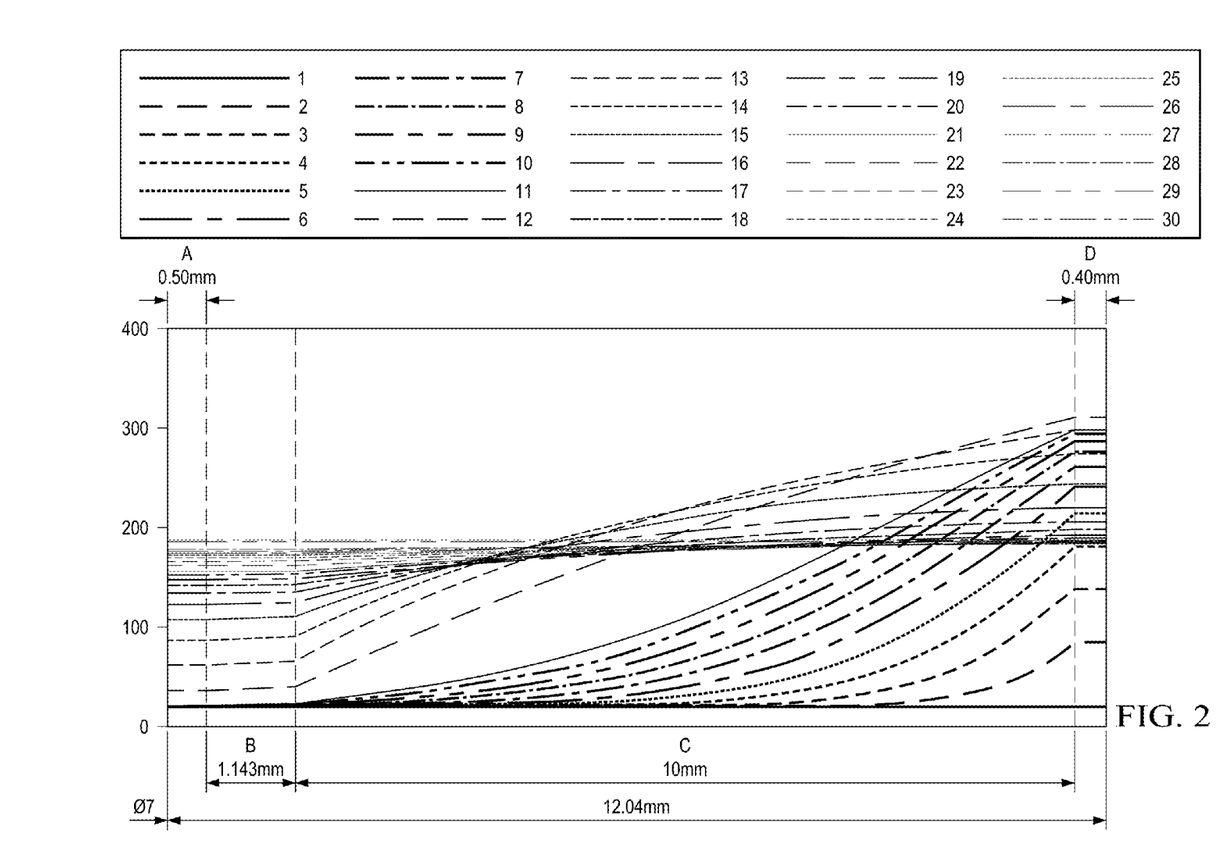
FIG. 2 depicts a graph illustrating the transmittance of heat through a cable including a 10 mm heat shield according to one embodiment.
Figure 3:
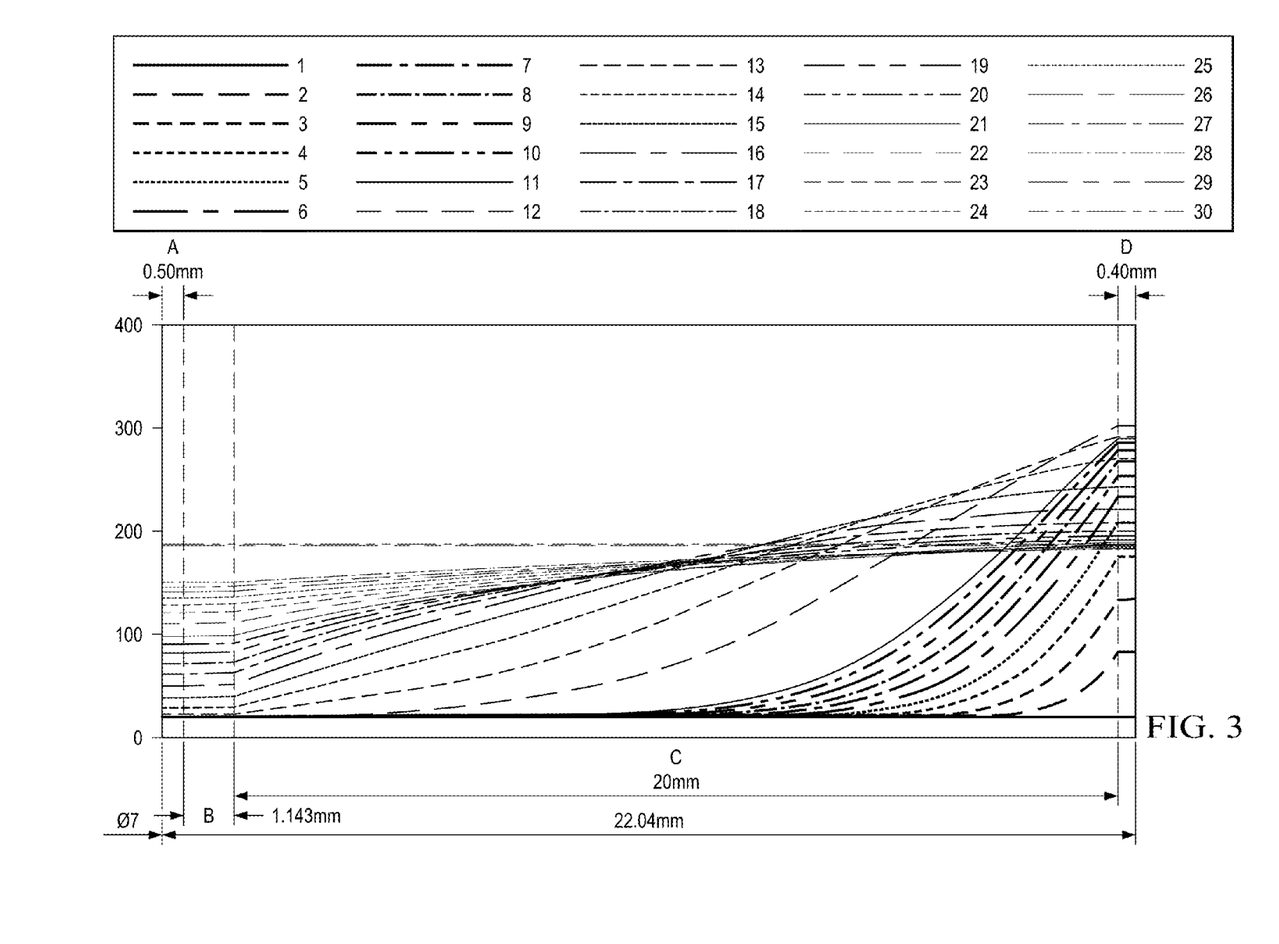
FIG. 3 depicts a graph illustrating the transmittance of heat through a cable including a 20 mm heat shield according to one embodiment.
Figure 4:
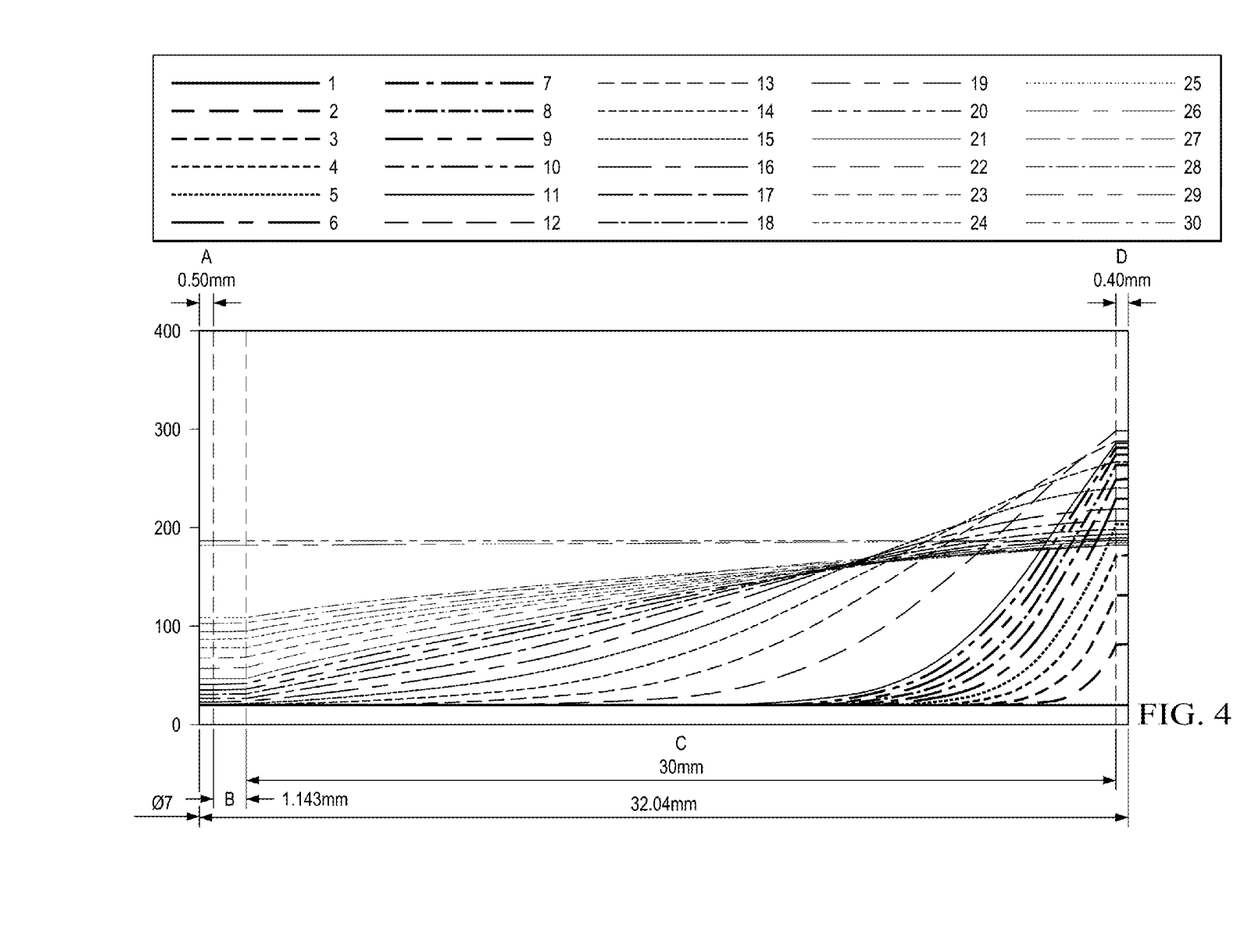
FIG. 4 depicts a graph illustrating the transmittance of heat through a cable including a 30 mm heat shield according to one embodiment.
Figure 5:
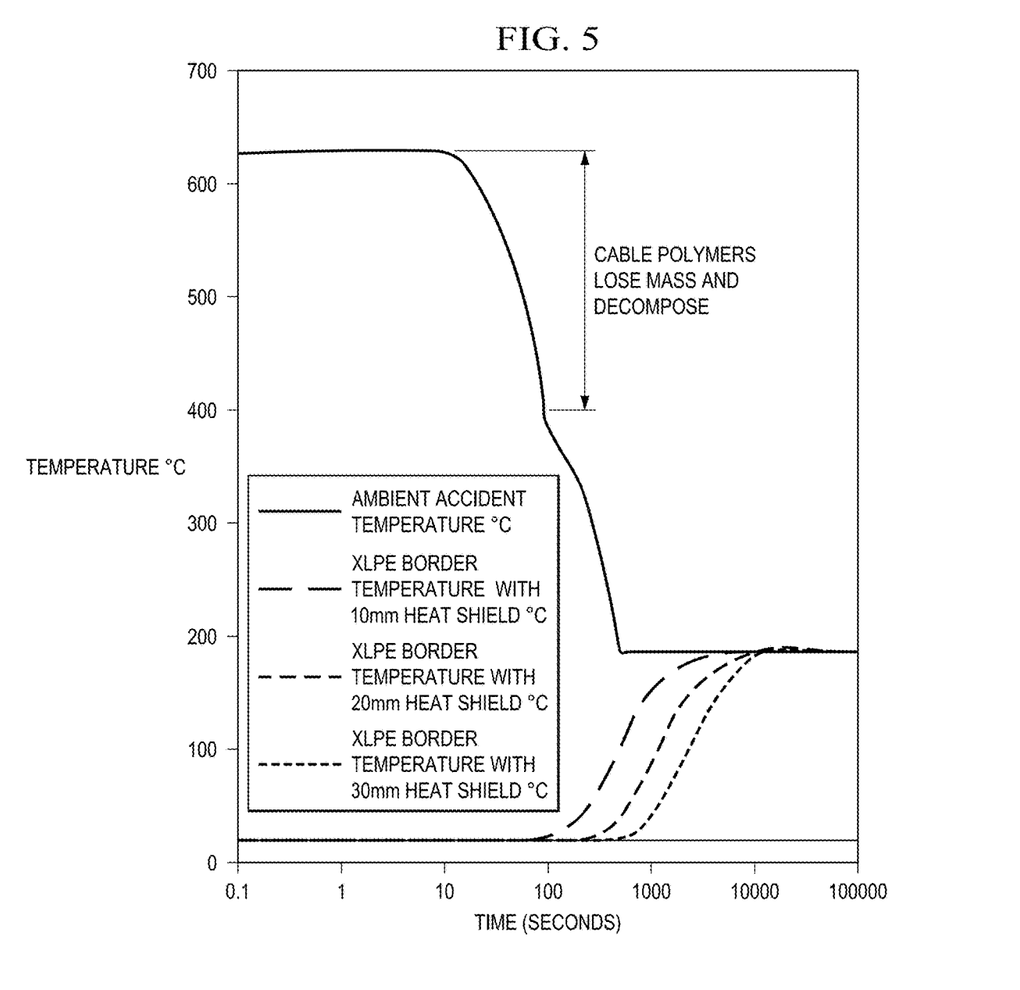
FIG. 5 depicts a graph illustrating the temperature of a reactor after a severe accident condition and the temperature of a cable insulation layer protected by heat shields according to one embodiment.

FIGS. 2 to 5 illustrate different properties of cables including a heat shield. FIGS. 2 to 4 depict the ability of a heat shield to delay thermal equilibration of cables with the surrounding environment until the environment has reached a safe thermal level that will not damage the underlying cables. FIG. 5 further illustrates the mitigation effect of a heat shield by comparing a reactor temperature following a severe accident condition to the temperature of a cable insulation layer over time.

FIG. 2 illustrates the ability of a heat shield to provide thermal insulation to an underlying cable until the ambient temperature of a reactor after a severe accident condition returns to safe thermal level. The simulated cable depicted in FIG. 2 includes a steel conductor 'A,' a crosslinked polyethylene insulation layer 'B,' a 10 mm thick heat shield thermal insulator 'C,' and a steel heat shield protective layer 'D.' FIG. 2 illustrates the simulation at 30 chronological lines numbered 1 through 30. The elapsed time of each line is depicted in Table 2.

TABLE 2

| Temperature Line # | Elapsed Time (seconds) |
|---|---|
| 1 | 0 |
| 2 | 10 |
| 3 | 20 |
| 4 | 30 |
| 5 | 40 |
| 6 | 50 |
| 7 | 60 |
| 8 | 70 |
| 9 | 80 |
| 10 | 90 |
| 11 | 100 |
| 12 | 200 |
| 13 | 300 |
| 14 | 400 |
| 15 | 500 |
| 16 | 600 |
| 17 | 700 |
| 18 | 800 |
| 19 | 900 |
| 20 | 1,000 |
| 21 | 1,100 |
| 22 | 1,300 |
| 23 | 1,500 |
| 24 | 1,700 |
| 25 | 1,900 |
| 26 | 2,100 |
| 27 | 2,300 |
| 28 | 2,500 |
| 29 | 10,000 |
| 30 | 100,000 |

As depicted by FIG. 2, the insulation layer 'B' of the simulated cable maintains a temperature that remains below 200° C. for the duration of the test despite the reactor reaching a simulated temperature of 634° C. in the first 10 seconds before gradually declining following a simulated severe accident condition. As depicted by time point 30, the conductor 'A' and insulation layer 'B' do not equilibrate with the outside reactor temperature until the thermal spike has reached a safe ambient temperature of about 190° C. several hours after the thermal spike initially occurred.

FIGS. 3 and 4 depict similar diagrams for cables that include thicker heat shield sections 'C.' All other components and conditions remain identical to the components and conditions described in FIG. 2. In FIG. 3, the heat shield 'C' is 20 mm thick and in FIG. 4, the heat shield 'C' is 30 mm thick. Both of the cables evaluated in FIGS. 3 and 4 demonstrate impressive results with the insulation layer 'B' of each such Example not reaching elevated temperatures for even longer periods of time than the insulation layer of the Example evaluated in FIG. 2. For example, a cable having a 30 mm thick heat shield 'C' simulated in FIG. 4 exhibited an insulation layer B' temperature of just 108° C. 41 minutes after a temperature spike in a severe accident condition. After 2 hours and 45 minutes, insulation layer 'B' had still not equilibrated with the ambient reactor temperature of 187° C. and had reached just 182° C.

FIG. 5 depicts a graph comparing the reactor temperature and the temperature of the insulation layer 'B' of each of FIGS. 2 to 4 in a single graph. As depicted in FIG. 5, the insulation layer 'B' never experiences heat that could comprise its performance. As can be appreciated, insulation layers formed of thermoset polyethylene ("XLPE") will not begin to degrade until temperatures above about 400° C. or about 600° C. are reached. The heat shield layer in each of the Examples prevented the insulation layer from rising to such temperatures.

The dimensions and values disclosed herein are not to be understood as being strictly limited to the exact numerical values recited. Instead, unless otherwise specified, each such dimension is intended to mean both the recited value and a functionally equivalent range surrounding that value.

It should be understood that every maximum numerical limitation given throughout this specification includes every lower numerical limitation, as if such lower numerical limitations were expressly written herein. Every minimum numerical limitation given throughout this specification will include every higher numerical limitation, as if such higher numerical limitations were expressly written herein. Every numerical range given throughout this specification will include every narrower numerical range that falls within such broader numerical range, as if such narrower numerical ranges were all expressly written herein.

Every document cited herein, including any cross-referenced or related patent or application, is hereby incorporated herein by reference in its entirety unless expressly excluded or otherwise limited. The citation of any document is not an admission that it is prior art with respect to any invention disclosed or claimed herein or that it alone, or in any combination with any other reference or references, teaches, suggests, or discloses any such invention. Further, to the extent that any meaning or definition of a term in this document conflicts with any meaning or definition of the same term in a document incorporated by reference, the meaning or definition assigned to that term in the document shall govern.

The foregoing description of embodiments and examples has been presented for purposes of description. It is not intended to be exhaustive or limiting to the forms described. Numerous modifications are possible in light of the above teachings. Some of those modifications have been discussed and others will be understood by those skilled in the art. The embodiments were chosen and described for illustration of ordinary skill in the art. Rather it is hereby intended the scope be defined by the claims appended various embodiments. The scope is, of course, not limited to the examples or embodiments set forth herein, but can be employed in any number of applications and equivalent articles by those of hereto.

What is claimed is:

1. A cable comprising:
   one or more conductors;

an insulation layer surrounding the one or more conductors; and a heat shield surrounding the insulation layer, the heat shield comprising:
   a thermal insulator having a thermal conductivity of about 0.2 W/m-K or less when measured at about 100° C., the thermal insulator comprising one or more of a silica glass fiber material, an aerogel, and an aerogel-derived material; and
   a protective layer surrounding and in contact with the thermal insulator;
wherein the cable passes the requirements of IEEE 323.

2. The cable of claim 1, further comprising a jacket layer disposed between the insulation layer and the heat shield.

3. The cable of claim 1, wherein the thermal insulator has a thermal conductivity of about 0.2 W/m-K or less when measured at about 600° C.

4. The cable of claim 1, wherein the thermal insulator has a thermal conductivity of about 0.05 W/m-K or less when measured at about 100° C.

5. The cable of claim 1, wherein the thermal insulator is formed of an aerogel.

6. The cable of claim 5, wherein the aerogel is a silicon dioxide aerogel.

7. The cable of claim 5, wherein the aerogel is in the form of a blanket or a tape.

8. The cable of claim 1, wherein the thermal insulator is spirally, helically, or longitudinally wrapped along the outer surface of the jacket.

9. The cable of claim 1, wherein the heat shield further comprises a protective layer surrounding the thermal insulator.

10. The cable of claim 9, wherein the protective layer comprises a metallic material comprising one or more of nickel, steel, copper, brass, zinc, and alloys thereof.

11. The cable of claim 1, wherein the protective layer is braided or wrapped.

12. The cable of claim 1, wherein the heat shield is resistant to one or more of radiation, heat, and moisture.

13. The cable of claim 1 is configured to operate in a nuclear environment for about 60 years or more.

14. The cable of claim 1 is configured to operate through a nuclear accident for about 48 hours or more, wherein the cable is subjected to an initial temperature spike of about 650° C. for about 10 seconds.

15. The cable of claim 1 can operate after failure of a nuclear reactor.

16. A cable comprising:
one or more conductors;
an insulation layer surrounding the one or more conductors;
a jacket surrounding the insulating layer and being formed of a material selected from the group consisting of cross-linked polyolefins, cross-linked polyethylene, polyimide, mica, chlorinated polyethylene, and chlorosulfonated polyethylene; and
a heat shield surrounding the jacket, the heat shield comprising:
   a thermal insulator; and
   optionally a protective layer surrounding the thermal insulator;
wherein the thermal insulator is formed of a thermal insulating material having a thermal conductivity of about 0.2 W/m-K or less when measured at about 100° C.

17. A cable comprising:
one or more conductors or optical fibers;
an insulation layer surrounding the one or more conductors or optical fibers; and
a heat shield surrounding the insulation layer, the heat shield comprising:
   a thermal insulator; and
   a protective layer surrounding and in contact with the thermal insulator;
wherein the thermal insulator is formed of a thermal insulating material comprising one or more of an ablative material, a silica glass fiber material, an aerogel, and an aerogel-derived material.

18. The cable of claim 17, wherein the thermal insulator has a thermal conductivity of about 0.2 W/m-K or less when measured at about 100° C.

19. The cable of claim 17 can operate through elevated temperatures of about 650° C. for about 48 hours or more.

* * * * *